(12) United States Patent
Takano

(10) Patent No.: US 10,255,266 B2
(45) Date of Patent: Apr. 9, 2019

(54) RELAY APPARATUS, DISPLAY APPARATUS, AND COMMUNICATION SYSTEM

(71) Applicant: Tomohide Takano, Kanagawa (JP)

(72) Inventor: Tomohide Takano, Kanagawa (JP)

(73) Assignee: RICOH COMPANY, LIMITED, Tokyo (JP)

(*) Notice: Subject to any disclaimer, the term of this patent is extended or adjusted under 35 U.S.C. 154(b) by 9 days.

(21) Appl. No.: 15/101,294

(22) PCT Filed: Dec. 3, 2014

(86) PCT No.: PCT/JP2014/081985
§ 371 (c)(1),
(2) Date: Jun. 2, 2016

(87) PCT Pub. No.: WO2015/083741
PCT Pub. Date: Jun. 11, 2015

(65) Prior Publication Data
US 2017/0322924 A1 Nov. 9, 2017

(30) Foreign Application Priority Data

Dec. 3, 2013 (JP) ................................. 2013-250480
Nov. 13, 2014 (JP) ................................. 2014-231043

(51) Int. Cl.
G06F 17/27 (2006.01)
G10L 15/26 (2006.01)
(Continued)

(52) U.S. Cl.
CPC .......... *G06F 17/2735* (2013.01); *G10L 13/00* (2013.01); *G10L 13/08* (2013.01);
(Continued)

(58) Field of Classification Search
CPC ...... G06F 17/2735; G10L 15/26; G10L 13/08
(Continued)

(56) References Cited

U.S. PATENT DOCUMENTS 6,424,935 B1 * 7/2002 Taylor ................... G10L 15/005
704/10
7,027,987 B1 * 4/2006 Franz ..................... G10L 15/22
704/236
(Continued)

FOREIGN PATENT DOCUMENTS

CN 1489302 A 4/2004
JP 2002-077437 3/2002
(Continued)

OTHER PUBLICATIONS

International Search Report dated Feb. 17, 2015 in PCT/JP2014/081985 filed on Dec. 3, 2014.
(Continued)

*Primary Examiner* — Edwin S Leland, III
(74) *Attorney, Agent, or Firm* — Oblon, McClelland, Maier & Neustadt, L.L.P.

(57) ABSTRACT

A relay apparatus includes a characteristic information storage unit, a first dictionary information storage unit, a first selection unit, and a first conversion unit. The characteristic information storage unit stores pieces of terminal information in association with respective pieces of characteristic information, each indicating a characteristic of a user. The first dictionary information storage unit stores the pieces of characteristic information in association with respective pieces of first dictionary information used for converting voice data into text data. The first selection unit selects, when voice data is received from a second communication terminal to communicate with a first communication terminal, the characteristic information associated with the terminal information for identifying the second communication terminal and selects the first dictionary information associated with the selected characteristic information. The first conversion unit converts the voice data received from the
(Continued)

second communication terminal to text data using the first dictionary information.

8 Claims, 13 Drawing Sheets

(51) Int. Cl.
   *G10L 13/08*   (2013.01)
   *G10L 13/00*   (2006.01)
   *G10L 15/22*   (2006.01)
   *G10L 15/30*   (2013.01)
(52) U.S. Cl.
   CPC ............. *G10L 15/26* (2013.01); *G10L 15/30* (2013.01); *G10L 2015/227* (2013.01)
(58) Field of Classification Search
   USPC .......................................................... 704/251
   See application file for complete search history.

(56) References Cited

U.S. PATENT DOCUMENTS

| | | | |
|---|---|---|---|
| 7,103,548 B2 | 9/2006 | Squibbs et al. | |
| 8,352,260 B2* | 1/2013 | Sung ................ | G10L 15/24 704/203 |
| 8,447,608 B1* | 5/2013 | Chang .............. | G10L 15/197 704/257 |
| 9,110,880 B1* | 8/2015 | Strope .............. | G10L 15/183 |
| 9,472,186 B1* | 10/2016 | Clark ............... | G10L 15/063 |
| 2002/0111794 A1* | 8/2002 | Yamamoto ........ | G10L 13/08 704/200 |
| 2002/0193996 A1* | 12/2002 | Squibbs ............ | H04M 1/72544 704/260 |
| 2003/0033146 A1* | 2/2003 | Morin ............... | G10L 15/065 704/251 |
| 2003/0185232 A1 | 10/2003 | Moore et al. | |
| 2003/0185359 A1 | 10/2003 | Moore et al. | |
| 2003/0185360 A1 | 10/2003 | Moore et al. | |
| 2003/0187641 A1 | 10/2003 | Moore et al. | |
| 2003/0187650 A1* | 10/2003 | Moore .............. | G06Q 20/085 704/260 |
| 2003/0187800 A1 | 10/2003 | Moore et al. | |
| 2003/0193961 A1 | 10/2003 | Moore et al. | |
| 2004/0003041 A1 | 1/2004 | Moore et al. | |
| 2004/0030750 A1 | 2/2004 | Moore et al. | |
| 2004/0086100 A1 | 5/2004 | Moore et al. | |
| 2005/0074101 A1 | 4/2005 | Moore et al. | |
| 2005/0165602 A1* | 7/2005 | Cote ................. | G10L 15/183 704/9 |
| 2007/0011012 A1* | 1/2007 | Yurick .............. | G10L 15/26 704/277 |
| 2008/0109212 A1* | 5/2008 | Witbrock .......... | G06F 17/2785 704/9 |
| 2011/0135084 A1 | 6/2011 | Moore et al. | |
| 2011/0200179 A1 | 8/2011 | Moore et al. | |
| 2011/0202347 A1 | 8/2011 | Moore et al. | |
| 2013/0262106 A1* | 10/2013 | Hurvitz ............ | G10L 15/183 704/235 |
| 2014/0278421 A1* | 9/2014 | Komissarchik .... | G09B 19/06 704/251 |
| 2015/0269136 A1* | 9/2015 | Alphonso ......... | G06F 17/276 704/9 |
| 2015/0278196 A1* | 10/2015 | Dua ................. | G06F 17/2785 704/9 |
| 2015/0348538 A1* | 12/2015 | Donaldson ....... | G10L 15/08 704/235 |
| 2016/0275942 A1* | 9/2016 | Drewes ............ | G06F 17/2735 |
| 2017/0069314 A1* | 3/2017 | Mun ................ | G10L 15/183 |
| 2017/0133007 A1* | 5/2017 | Drewes ............ | G10L 15/063 |
| 2017/0194000 A1* | 7/2017 | Itani ................ | G10L 15/22 |
| 2017/0322924 A1* | 11/2017 | Takano ............ | G06F 17/2735 |

FOREIGN PATENT DOCUMENTS

| | | | |
|---|---|---|---|
| JP | 2002-244688 | 8/2002 | |
| JP | 2003-092628 | 3/2003 | |
| JP | 2004-129174 | 4/2004 | |
| JP | 2007-096449 | 4/2007 | |
| JP | 2009-139390 | 6/2009 | |
| JP | 2012-044524 | 3/2012 | |
| JP | 2014-167517 | 9/2014 | |
| KR | 10-2013-0080823 A | 7/2013 | |
| WO | WO-2015083741 A1 * | 6/2015 | ............. G10L 15/26 |

OTHER PUBLICATIONS

Partial European Search Report dated Nov. 4, 2016 in Patent Application No. 14867071.4.
Combined Office Action and Search Report dated Jan. 26, 2018 in Chinese Patent Application No. 201480065797.1 (with partial English language translation and English translation of categories of cited documents) citing reference AO therein, 18 pages.
Office Action dated Sep. 29, 2017 in Korean Patent Application No. 10-2016-7014833 (with English language translation).
Office Action dated Jun. 13, 2018 in European Patent Application No. 14 867 071.4, citing documents AA and AB therein, 7 pages.

* cited by examiner

FIG.3

| ID | TERMINAL INFORMATION | SEX INFORMATION | AGE INFORMATION | OCCUPATION INFORMATION |
|---|---|---|---|---|
| 001 | xxx-001 | MALE | 38 | SALES |
| 002 | xxx-002 | MALE | 25 | DEVELOPMENT |
| 003 | xxx-003 | FEMALE | 26 | GENERAL AFFAIRS |
| 004 | xxx-004 | MALE | 32 | DEVELOPMENT |
| 005 | xxx-005 | MALE | 58 | SALES |
| 006 | xxx-006 | FEMALE | 46 | SALES |

FIG.4

| OCCUPATION INFORMATION | FIRST DICTIONARY INFORMATION ID |
|---|---|
| SALES | Voice_1 |
| DEVELOPMENT | Voice_2 |
| GENERAL AFFAIRS | Voice_3 |
| DEVELOPMENT | Voice_4 |
| SALES | Voice_5 |
| SALES | Voice_6 |

| AGE | SECOND DICTIONARY INFORMATION ID | |
|---|---|---|
| | MALE | FEMALE |
| TO 10 | DB_M_10 | DB_F_10 |
| TO 20 | DB_M_20 | DB_F_20 |
| TO 40 | DB_M_40 | DB_F_40 |
| TO 60 | DB_M_60 | DB_F_60 |
| OVER 60 | DB_M_80 | DB_F_80 |

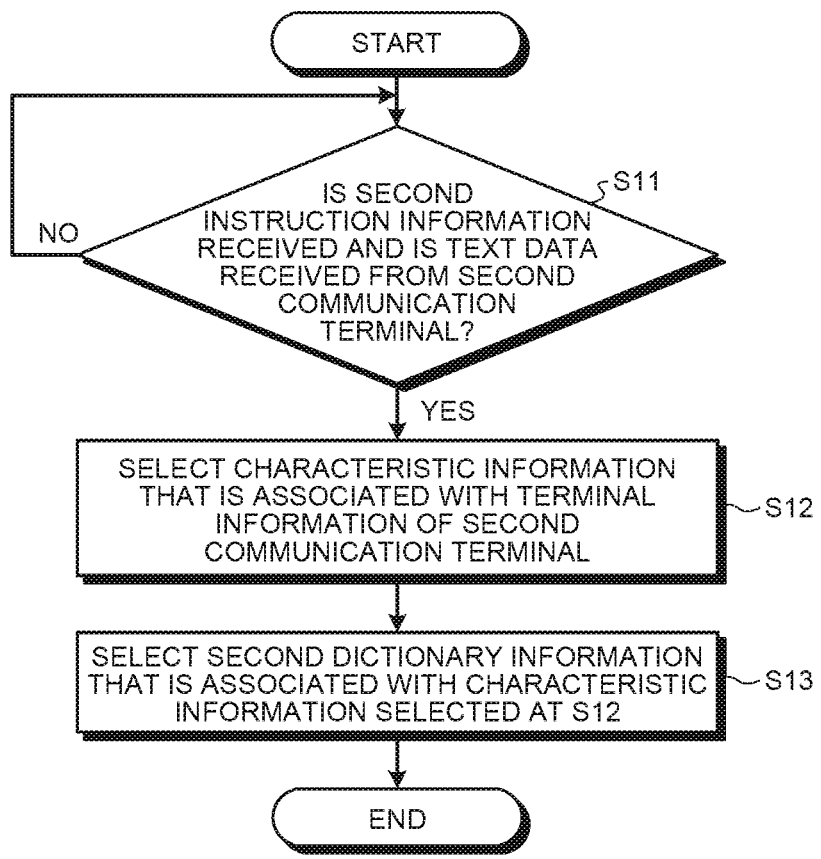

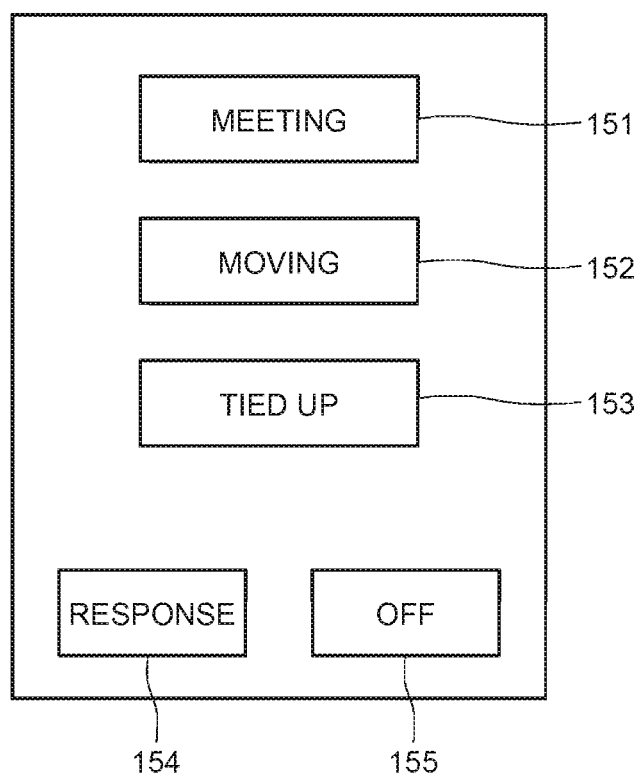

| NOTIFICATION INFORMATION | SECOND INFORMATION |
|---|---|
| URGENT | [URGENT] URGENT BUSINESS |
| CALLBACK | CALL BACK LATER |
| OK | UNDERSTOOD |

FIG.19

| TERMINAL INFORMATION | OCCUPATION INFORMATION ||
|---|---|---|
|  | 9:00 TO 18:00 | OTHER HOURS |
| xxx-001 | SALES | FATHER |

FIG.20

| TERMINAL INFORMATION | OCCUPATION INFORMATION ||
|---|---|---|
|  | WITHIN __ km AROUND HOUSE OF USER OF COMMUNICATION TERMINAL | OTHER AREAS |
| xxx-001 | SALES | FATHER |

RELAY APPARATUS, DISPLAY APPARATUS, AND COMMUNICATION SYSTEM

FIELD

The present invention relates to a relay apparatus, a display apparatus, and a communication system.

BACKGROUND

Known communication systems utilize data conversion from voice data to text data or data conversion from text data to voice data.

A technique disclosed in Patent Literature 1, for example, prepares in advance first dictionary information ("word dictionary") that is used for converting text data into voice data. The technique converts input text data into a corresponding phonetic character string using the first dictionary information and processes the converted phonetic character string on the basis of predetermined information included in the input text data so as to obtain synthesized voice to which, for example, feeling, thought, sex, looks, body height, body weight, age, occupation, hometown, hobby, and taste are added.

The technique disclosed in Patent Literature 1 further includes second dictionary information ("word model" and "language model") prepared in advance and used for converting voice data into text data. The technique converts input voice data into text data using the second dictionary information, estimates from the input voice data, feeling, thought, physical condition, sex, looks, body height, body weight, age, occupation, hometown, hobby, and taste, for example, of a speaker, and processes the converted text data in accordance with a result of the estimation.

SUMMARY

Technical Problem

Unfortunately, optimum communication control depending on user characteristics and statuses has not hitherto been performed.

The present invention has been made in view of the foregoing situation and it is an object of the present invention to perform optimum communication control depending on user characteristics and statuses.

Solution to Problem

To solve the above problems and achieve the object, the present invention is a relay apparatus to relay communication among a plurality of communication terminals including at least a first communication terminal and a second communication terminal. The relay apparatus includes a characteristic information storage unit configured to store a plurality of pieces of characteristic information, each indicating a characteristic of a user who uses a corresponding communication terminal, so that each of a plurality of pieces of terminal information for identifying the communication terminals is associated with a corresponding one of the pieces of characteristic information; a first dictionary information storage unit configured to store a plurality of pieces of first dictionary information, each used for converting voice data into text data, so that each piece of the characteristic information is a corresponding one of the pieces of first dictionary information; a first selection unit configured to, when voice data is received from the second communication terminal that is to communicate with the first communication terminal, select a piece of the characteristic information associated with a piece of the terminal information for identifying the second communication terminal and select a piece of the first dictionary information associated with the selected piece of the characteristic information; and a first conversion unit configured to convert the voice data received from the second communication terminal into text data using the piece of the first dictionary information selected by the first selection unit.

The present invention is a relay apparatus to relay communication among a plurality of communication terminals including at least a first communication terminal and a second communication terminal. The relay apparatus includes a characteristic information storage unit configured to store a plurality of pieces of characteristic information, each indicating a characteristic of a user who uses a corresponding communication terminal, so that each of a plurality of pieces of terminal information for identifying the communication terminals is associated with a corresponding one of the pieces of characteristic information; a second dictionary information storage unit configured to store a plurality of pieces of second dictionary information, each used for converting text data into voice data, so that each piece of the characteristic information is a corresponding one of the pieces of second dictionary information; a second selection unit configured to, when text data is received from the second communication terminal that is to communicate with the first communication terminal, select a piece of the characteristic information associated with a piece of the terminal information for identifying the second communication terminal and select a piece of the second dictionary information associated with the selected piece of the characteristic information; and a second conversion unit configured to convert the text data received from the second communication terminal into voice data using the piece of the second dictionary information selected by the second selection unit.

Advantageous Effects of Invention

According to the present invention, it is possible to provide a relay apparatus, a display apparatus, and a communication system that can improve accuracy in conversion from input text data to voice data or conversion from input voice data to text data.

BRIEF DESCRIPTION OF DRAWINGS

FIG. 3 is a diagram illustrating an exemplary configuration of data stored in a characteristic information storage section.

FIG. 4 is a diagram illustrating an exemplary configuration of data stored in a first dictionary information storage section.

FIG. 7 is a flowchart illustrating an exemplary method for selecting second dictionary information.

FIG. 8 is a diagram illustrating an exemplary configuration of data stored in a voice data conversion information storage section.

FIG. 13 is a diagram illustrating an exemplary first screen.

FIG. 14 is a diagram illustrating an exemplary configuration of data stored in a first conversion information storage section.

FIG. 19 is a diagram for illustrating a modification of characteristic information associated with terminal information.

FIG. 20 is a diagram for illustrating a modification of characteristic information associated with terminal information.

DESCRIPTION OF EMBODIMENTS

The following details, with reference to the accompanying drawings, a relay apparatus, a display apparatus, and a communication system according to an embodiment of the present invention.

Figure 1:
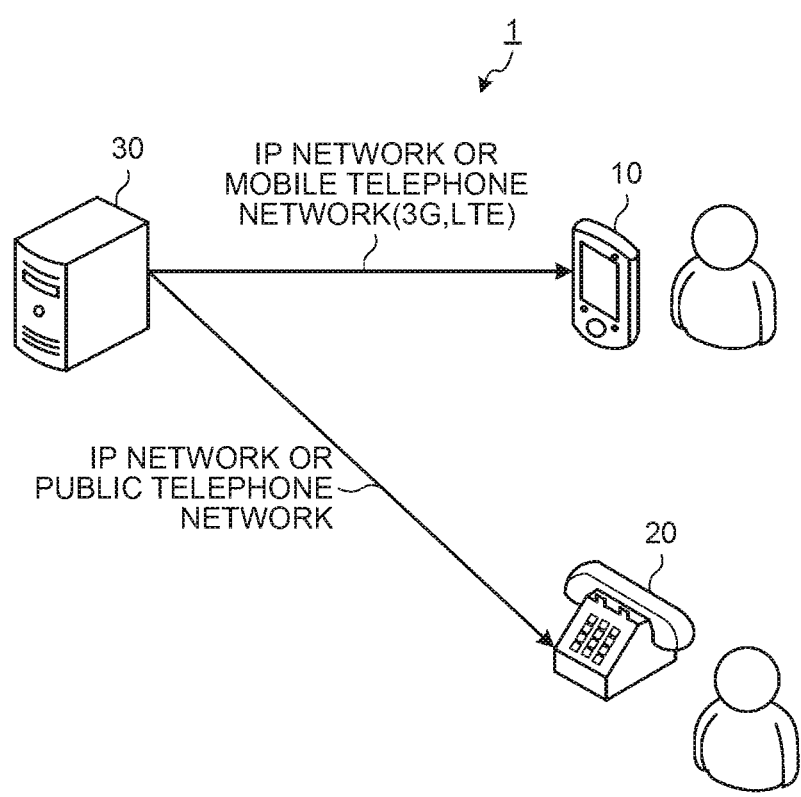
FIG. 1 is a diagram illustrating an exemplary configuration of a communication system.

FIG. 1 is a diagram illustrating an exemplary configuration of a communication system 1 according to the present embodiment. As illustrated in FIG. 1, the communication system 1 includes a voice communication terminal 10, a data communication terminal 20, and a relay apparatus 30. The voice communication terminal 10 is a telephone terminal capable of performing a telephone conversation by voice. Examples of the voice communication terminal 10 include, but are not limited to, a fixed telephone set (IP telephone, analog telephone) and a mobile telephone terminal. In the present example, the voice communication terminal 10 is a fixed telephone set on which a dial operation is performed using pushbuttons. The present example will be exemplified by a fixed telephone set having a function of transmitting a number or a code according to a button input (dual-tone multi-frequency, hereinafter referred to as "DTMF"). The voice communication terminal 10 is an exemplary "communication terminal" in the claims.

The data communication terminal 20 is a telephone terminal having a voice communication function and a rich UI. Examples of the data communication terminal 20 include, but are not limited to, a mobile telephone terminal (including a smartphone) and a business phone. The present example will be exemplified by a mobile telephone terminal. When a call signal transmitted from the relay apparatus 30 is received (when an incoming call is received), the data communication terminal 20 offers such functions as displaying on a display unit a screen that includes a plurality of pieces of status information (to be described later) that are prepared in advance, receiving a user operation with respect to the screen, and transmitting to the relay apparatus 30 information that varies according to the received user operation. The data communication terminal 20 is an exemplary "communication terminal" in the claims.

It is noted that, in the description that follows, the voice communication terminal 10 and the data communication terminal 20 may be each referred to simply as a "communication terminal" when the voice communication terminal 10 and the data communication terminal 20 do not need to be differentiated from each other. Additionally, in the description that follows, the voice communication terminal 10 may correspond to the "first communication terminal" in the claims and the data communication terminal 20 may correspond to the "second communication terminal" in the claims; alternatively, the voice communication terminal 10 may correspond to the "second communication terminal" in the claims and the data communication terminal 20 may correspond to the "first communication terminal" in the claims.

The relay apparatus 30 relays communication between the voice communication terminal 10 and the data communication terminal 20. The relay apparatus 30 has such functions as performing a call originating process for establishing a session between communication terminals and a relay process for communication data. FIG. 1 illustrates only the voice communication terminal 10 and the data communication terminal 20 as the communication terminals included in the communication system 1, and is illustrative only and is not intended to be in any way limiting. Alternatively, the communication system 1 may include any other number or types of communication terminals. The relay apparatus 30 has functions of converting voice data received from the communication terminal into text data and converting text data received from the communication terminal into voice data. This will be elaborated on later.

It is noted that each of the elements described above (voice communication terminal 10, data communication terminal 20, and relay apparatus 30) can be connected via, for example, an IP network, a public telephone network, and a mobile telephone network (3G, LTE).

Figure 2:
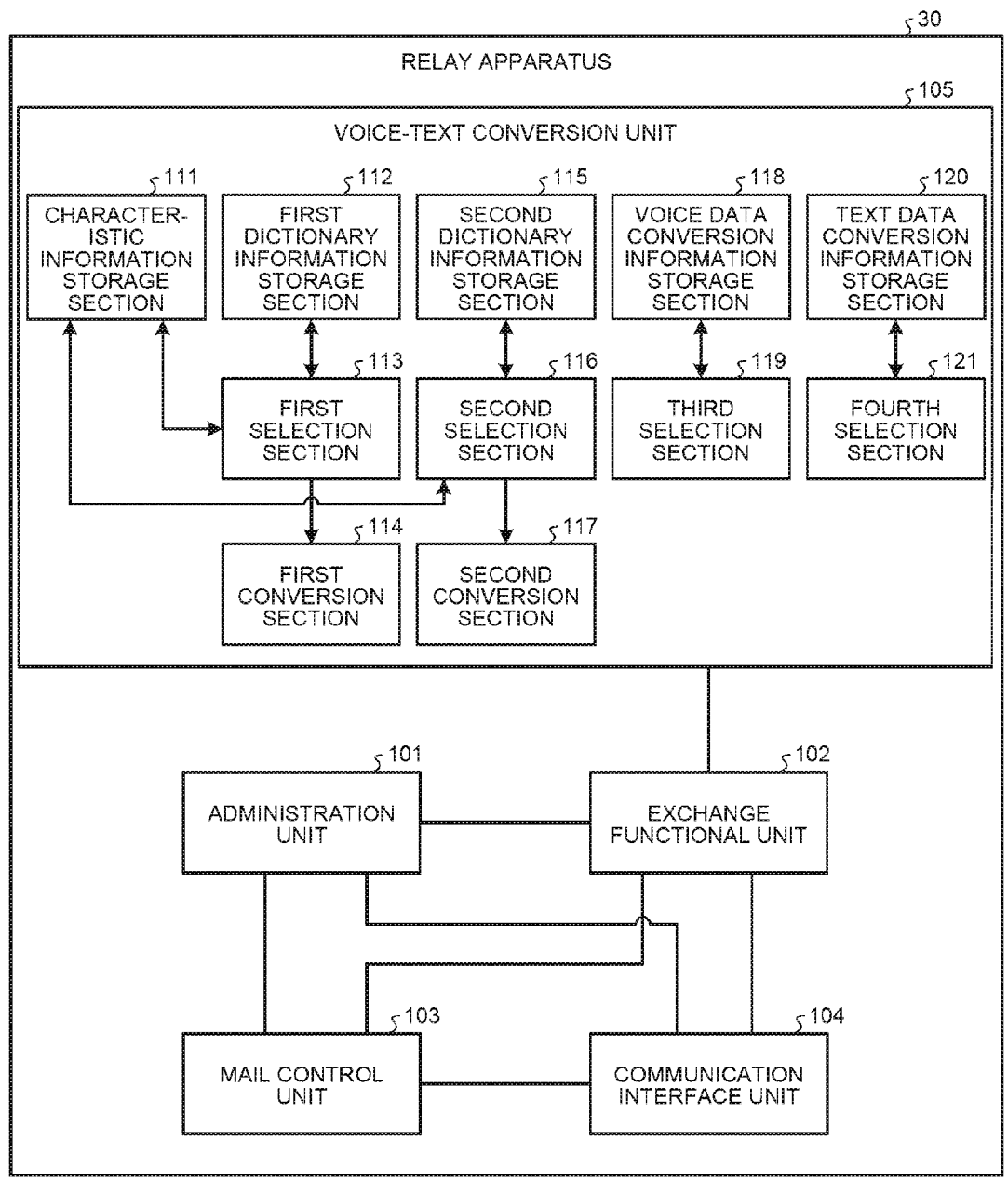
FIG. 2 is a diagram illustrating an exemplary configuration of a relay apparatus.

FIG. 2 is a diagram illustrating an exemplary configuration of the relay apparatus 30. As illustrated in FIG. 2, the relay apparatus 30 includes an administration unit 101, an exchange functional unit 102, a voice-text conversion unit 105, a mail control unit 103, and a communication interface unit 104. The administration unit 101 has a function of setting numbering plan information and terminal information that identifies communication terminals. This setting function may, for example, be provided by a web 171 via the communication interface unit 104. The administration unit 101 also has a function of retaining call record information.

The exchange functional unit 102 has such functions as performing matching between a call originator and a call receiver of a call by referring to the numbering plan information and the terminal information retained by the administration unit 101, performing a call originating process, and performing a relay process for communication data by incorporating processing performed by the voice-text conversion unit 105 to be described later in voice communication. The exchange functional unit 102 performs the following functions, although details will be described later. Specifically, when first instruction information for instructing conversion of voice data into text data is received via the communication interface unit 104, the exchange functional unit 102 requests the voice-text conversion unit 105 to perform a process of converting voice data that is received from one of the two communication terminals for which matching has been performed into text data. When second instruction information for instructing conversion of text data into voice data is received via the communication interface unit 104, the exchange functional unit 102 requests the voice-text conversion unit 105 to perform a process of converting text data that is received from one of the two communication terminals for which matching has been performed into voice data.

The mail control unit 103 has a function of transmitting mail in response to a request from the exchange functional unit 102 and the administration unit 101. The communication interface unit 104 provides the exchange functional unit 102, the administration unit 101, and the mail control unit 103 with an IP network function. Specifically, the communication interface unit 104 includes a communication interface, such as Ethernet (registered trademark) and Wi-Fi, and TCP/UDP and IP network software stacks. An analog line and an ISDN line for voice communication may be provided for the exchange functional unit 102.

The voice-text conversion unit 105 has functions of converting voice data received from a communication terminal into text data and converting text data received from a communication terminal into voice data in response to a request from the exchange functional unit 102. In the present embodiment, the voice-text conversion unit 105 includes a characteristic information storage section 111, a first dictionary information storage section 112, a first selection section 113, a first conversion section 114, a second dictionary information storage section 115, a second selection section 116, a second conversion section 117, voice data conversion information storage section 118, a third selection section 119, a text data conversion information storage section 120, and a fourth selection section 121.

The characteristic information storage section 111 stores therein a plurality of pieces of terminal information, each identifying a specific communication terminal, in association with respective pieces of characteristic information, each indicating a characteristic of a user who uses the communication terminal. The present example will be exemplified by a case in which a telephone number is used for the terminal information. The example however, illustrative only and is not intended to be in any way limiting. The present example also be exemplified by a case in which either one, or a combination of two or more, of sex information indicating sex of the user, age information indicating age of the user, and occupation information indicating occupation of the user is used as the characteristic information. The example however, illustrative only and is not intended to be in any way limiting. FIG. 3 is a diagram illustrating an exemplary configuration of data stored in the characteristic information storage section 111. In the example illustrated in FIG. 3, the characteristic information storage section 111 stores therein a combination of a specific piece of terminal information and an ID assigned to the specific piece of terminal information in association with sex information, age information, and occupation information.

The first dictionary information storage section 112 stores therein the pieces of characteristic information in association with respective pieces of first dictionary information that is used for converting voice data into text data. The present example associates pieces of characteristic information with respective pieces of first dictionary information in which the respective pieces of characteristic information are incorporated. FIG. 4 is a diagram illustrating an exemplary configuration of the data stored in the first dictionary information storage section 112. In the example illustrated in FIG. 4, the first dictionary information storage section 112 stores therein pieces of occupation information indicating respective occupations of users in association with respective first dictionary information IDs indicating respective pieces of information that identify respective pieces of first dictionary information. It is noted that the present example uses the occupation information as the characteristic information. The example is, however, illustrative only and is not intended to be in any way limiting. For example, the age information or the sex information may be used as the characteristic information. Alternatively, a combination of at least two of the age information, the sex information, and the occupation information may be used as the characteristic information.

Additionally, in the present example, the pieces of first dictionary information having one-to-one correspondence to the respective first dictionary information IDs are stored in a different memory (not illustrated). To state the foregoing from a different viewpoint, the first dictionary information storage section 112 may be considered to store therein the pieces of occupation information in association with the respective pieces of first dictionary information. Alternatively, the first dictionary information storage section 112 may be configured to further include a space in which the pieces of first dictionary information having one-to-one correspondence to the respective first dictionary information IDs are stored. Still alternatively, the first dictionary information storage section 112 may be configured to store therein the pieces of characteristic information (e.g., occupation information) in association with the respective pieces of first dictionary information without storing therein the first dictionary information IDs.

In addition, in the present example, the first dictionary information associates a plurality of phonemic strings prepared in advance with one or more pieces of text indicating candidates for conversion from voice to text (character string) and respective pieces of priority information indicating priorities of respective candidates. The example is, however, illustrative only and is not intended to be in any way limiting. Known various types of dictionary information used for converting voice data into text data may be used as the first dictionary information. It is noted that phoneme is a minimum unit of voice for distinguishing words. Additionally, in the present example, the second dictionary information also includes modeling information that indicates breaks (modeling) of voice data during conversion from voice data to text data. The modeling information included in each piece of the first dictionary information is set according to the characteristic information associated with the specific piece of first dictionary information.

Reference is made back to FIG. 2 and the following further describes FIG. 2. When voice data is received from one (may be referred to as a "second communication terminal" in the following) of the two communication terminals for which matching has been performed by the exchange functional unit 102, the first selection section 113 refers to the characteristic information storage section 111 and selects a specific piece of characteristic information that is associated with the piece of terminal information that identifies the second communication terminal. The first selection section 113 then refers to the first dictionary information storage section 112 and selects a specific piece of first dictionary information that is associated with the selected piece of characteristic information. It is here noted that when the first instruction information (information for instructing conversion of voice data into text data) is received, the first selection section 113 selects the first dictionary information and, when the first instruction information is not received, the first selection section 113 does not select the first dictionary information.

Figures 5, 6:
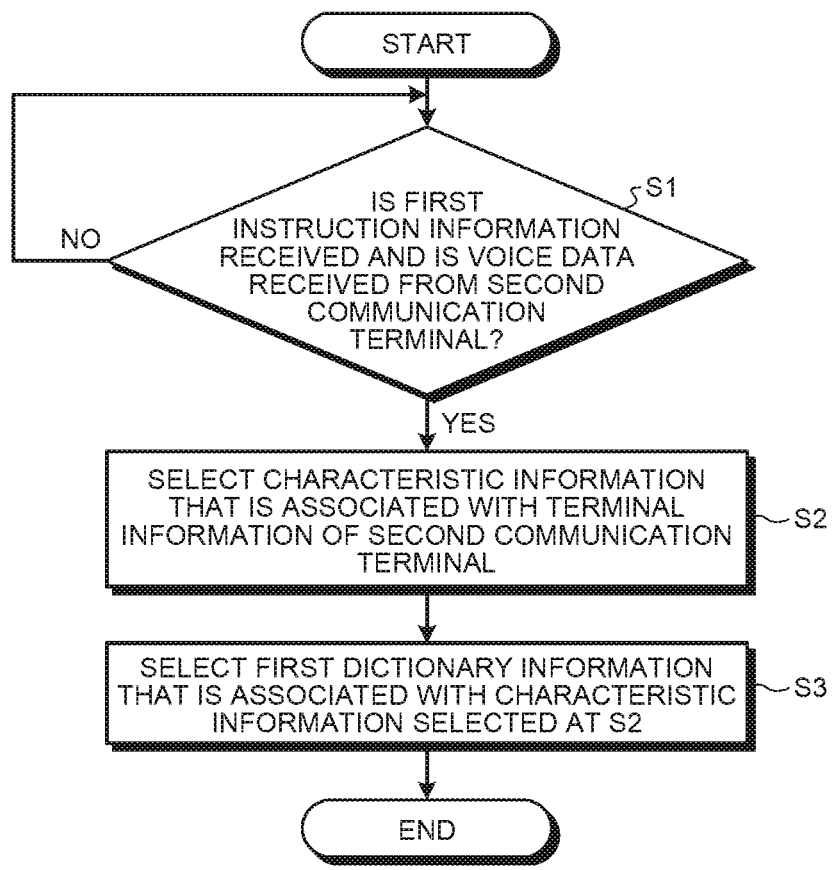
FIG. 5 is a flowchart illustrating an exemplary method for selecting first dictionary information.
FIG. 6 is a diagram illustrating an exemplary configuration of data stored in a second dictionary information storage section.

The following describes, with reference to FIG. 5, a method for selecting the first dictionary information when the relay apparatus 30 receives the first instruction information and when voice data is received from the second communication terminal. As illustrated in FIG. 5, when the first instruction information is received via the communication interface unit 104 and voice data is received from the second communication terminal (Yes at Step S1), the exchange functional unit 102 requests the voice-text conversion unit 105 to perform a process of converting the voice data received from the second communication terminal into text data. The voice-text conversion unit 105, upon receipt of the foregoing request, instructs the first selection section 113 to select the first dictionary information. The first selection section 113, upon receipt of the foregoing instruction, refers to the characteristic information storage section 111 and selects a specific piece of characteristic information (occupation information in the present example) that is associated with the terminal information that identifies the second communication terminal (Step S2). The first selection section 113 next refers to the first dictionary information storage section 112 and selects a specific piece of first dictionary information that is associated with the piece of characteristic information selected at Step S2 (Step S3).

Reference is made back to FIG. 2 and the following further describes FIG. 2. When the first selection section 113 has selected the first dictionary information, the voice-text conversion unit 105 instructs the first conversion section 114 to convert the voice data received from the second communication terminal into text data using the first dictionary information selected by the first selection section 113. The first conversion section 114, upon receipt of the foregoing instruction, converts the voice data received from the second communication terminal into text data using the first dictionary information selected by the first selection section 113.

As a response to the request (request to convert the voice data into text data) from the exchange functional unit 102, the voice-text conversion unit 105 passes text data that has been converted by the first conversion section 114 to the exchange functional unit 102. The exchange functional unit 102 performs control to transmit the text data that has been converted by the first conversion section 114 to the other communication terminal of the two communication terminals for which matching has been performed, specifically, a communication terminal with which the second communication terminal communicates (may be referred to as a "first communication terminal" in the following). In the present example, the exchange functional unit 102 may be considered to have a function that is comparable to a function of the "first transmission control unit" in the claims.

As described above, in the present embodiment, each of the pieces of characteristic information is associated with a specific piece of first dictionary information in which the corresponding characteristic information is incorporated. Thus, in the first dictionary information associated with occupation information indicating a "biologist", for example, a piece of text indicating a conversion candidate of "spider" and a piece of text indicating a conversion candidate of "cloud" may be associated with a phonemic string indicating a pronunciation of "kumo", and priority information may be associated with the phonemic string such that a first priority is given to the conversion candidate of "spider" and a second priority is given to the conversion candidate of "cloud". Alternatively, in the first dictionary information associated with occupation information indicating a "child", for example, the piece of text indicating the conversion candidate of "spider" and the piece of text indicating the conversion candidate of "cloud" may be associated with the phonemic string indicating a pronunciation of "kumo", and priority information may be associated with the phonemic string such that a second priority is given to the conversion candidate of "spider" and a first priority is given to the conversion candidate of "cloud".

Thus, when the phonemic string indicating a pronunciation of "kumo" is to be converted into text, the phonemic string is preferentially converted into the piece of text indicating the conversion candidate of "spider", if the first dictionary information associated with the occupation information indicating a "biologist" is selected. If the first dictionary information associated with the occupation information indicating a "child" is selected, the phonemic string is preferentially converted into the piece of text indicating the conversion candidate of "cloud". Specifically, the present embodiment can achieve an advantageous effect that the characteristic of a user who inputs voice data can be accurately reflected when the voice data is to be converted into text data.

The following further describes FIG. 2. The second dictionary information storage section 115 stores therein a plurality of pieces of characteristic information in association with respective pieces of second dictionary information that are used for converting text data into voice data. The present example associates pieces of characteristic information with respective pieces of second dictionary information in which the respective pieces of characteristic information are incorporated. FIG. 6 is a diagram illustrating an exemplary configuration of the data stored the second dictionary information storage section 115. In the example illustrated in FIG. 6, the second dictionary information storage section 115 stores therein combinations of age information and sex information (information indicating "male" or "female") in association with respective second dictionary information IDs indicating respective pieces of information that identify respective pieces of second dictionary information. It is noted that the present example uses the combination of age information and sex information as the characteristic information. The example is, however, illustrative only and is not intended to be in any way limiting. For example, any one of the age information, the sex information, and the occupation information may be used as the characteristic information. Alternatively, the combination of the age information and the occupation information may be used as the characteristic information, or the combination of the sex information and the occupation information may be used as the characteristic information.

Additionally, in the present example, the pieces of second dictionary information having one-to-one correspondence to the respective second dictionary information IDs are stored in a different memory (not illustrated). To state the foregoing from a different viewpoint, the second dictionary information storage section 115 may be considered to store therein the combinations of the age information and the sex information in association with the respective pieces of second dictionary information. Alternatively, the second dictionary information storage section 115 may be configured to further include a space in which the pieces of second dictionary information having one-to-one correspondence to the respective second dictionary information IDs are stored. Still alternatively, the second dictionary information storage section 115 may be configured to store therein the pieces of characteristic information (e.g., combinations of the age information and the sex information) in association with the respective pieces of second dictionary information without storing therein the second dictionary information IDs.

In addition, in the present example, the second dictionary information includes first correspondence information and second correspondence information. The first correspondence information associates a plurality of character strings (pieces of text) prepared in advance with respective phonemic strings indicating pronunciation of the pieces of text. The second correspondence information associates a plurality of phonemic strings with respective parameters for controlling voice tone qualities (such as voice quality and intonation). The example is, however, illustrative only and is not intended to be in any way limiting. Known various types of dictionary information used for converting text data into voice data may be used for the second dictionary information.

Reference is made back to FIG. 2 and the following further describes FIG. 2. When text data is received from one (second communication terminal) of the two communication terminals for which matching has been performed by the exchange functional unit 102, the second selection section 116 refers to the characteristic information storage section 111 and selects a specific piece of characteristic information that is associated with a piece of terminal information that identifies the second communication terminal. The second selection section 116 then refers to the second dictionary information storage section 115 and selects a specific piece of second dictionary information that is associated with the selected piece of characteristic information. It is here noted that when the second instruction information (information for instructing conversion of text data into voice data) is received, the second selection section 116 selects the second dictionary information and, when the second instruction information is not received, the second selection section 116 does not select the second dictionary information.

The following describes, with reference to FIG. 7, a method for selecting the second dictionary information when the relay apparatus 30 receives the second instruction information and when text data is received from the second communication terminal. As illustrated in FIG. 7, when the second instruction information is received via the communication interface unit 104 and text data is received from the second communication terminal (Yes at Step S11), the exchange functional unit 102 requests the voice-text conversion unit 105 to perform a process of converting the text data received from the second communication terminal into voice data. The voice-text conversion unit 105, upon receipt of the foregoing request, instructs the second selection section 116 to select the second dictionary information. The second selection section 116, upon receipt of the foregoing instruction, refers to the characteristic information storage section 111 and selects a specific piece of characteristic information (a combination of the sex information and the age information in the present example) that is associated with the terminal information that identifies the second communication terminal (Step S12). The second selection section 116 next refers to the second dictionary information storage section 115 and selects a specific piece of second dictionary information that is associated with the piece of characteristic information selected at Step S12 (Step S13).

Reference is made back to FIG. 2 and the following further describes FIG. 2. When the second selection section 116 has selected the second dictionary information, the voice-text conversion unit 105 instructs the second conversion section 117 to convert the text data received from the second communication terminal into voice data using the second dictionary information selected by the second selection section 116. The second conversion section 117, upon receipt of the foregoing instruction, converts the text data received from the second communication terminal into voice data using the second dictionary information selected by the second selection section 116. As a response to the request (request to convert the text data into voice data) from the exchange functional unit 102, the voice-text conversion unit 105 passes voice data that has been converted by the second conversion section 117 to the exchange functional unit 102. The exchange functional unit 102 performs control to transmit the voice data that has been converted by the second conversion section 117 to the first communication terminal. In the present example, the exchange functional unit 102 may be considered to have a function that is comparable to a function of the "second transmission control unit" in the claims.

The voice data conversion information storage section 118 illustrated in FIG. 2 stores therein a plurality of pieces of status information, each representing a specific user status, in association with respective preset (fixed) pieces of voice data. FIG. 8 is a diagram illustrating an exemplary configuration of the data stored in the voice data conversion information storage section 118. In the example illustrated in FIG. 8, a fixed piece of voice data of "Having meeting and unable to answer phone" is associated with the status information indicating "Meeting"; a fixed piece of voice data of "On my way to XXX and unable to answer phone" is associated with the status information indicating "Moving"; and a fixed piece of voice data of "Tied up and unable to answer phone" is associated with the status information indicating "Tied up". It is noted that, in the present example, when a call signal transmitted from the relay apparatus 30 is received (when an incoming call is received), the data communication terminal 20 offers the functions of displaying on a display unit a screen that includes a plurality of pieces of status information that are prepared in advance (in the present example, the status information indicating "meeting", the status information indicating "moving", and the status information indicating "tied up"), selecting either one of the pieces of status information in accordance with a user operation with respect to the screen (e.g., touching), and transmitting to the relay apparatus 30 the status information selected in accordance with the user operation.

Reference is made back to FIG. 2 and the following further describes FIG. 2. When status information is received from one (second communication terminal) of the two communication terminals for which matching has been performed by the exchange functional unit 102, the third selection section 119 refers to the voice data conversion information storage section 118 and selects a specific piece of preset voice data that is associated with the status information received from the second communication terminal.

When the status information is received from the second communication terminal via the communication interface unit 104, the exchange functional unit 102 requests the voice-text conversion unit 105 to select the piece of preset voice data that is associated with the status information received from the second communication terminal. The voice-text conversion unit 105, upon receipt of the foregoing request, instructs the third selection section 119 to select the voice data that is associated with the status information received from the second communication terminal. The third selection section 119, having received the foregoing instruction, refers to the voice data conversion information storage section 118 and selects the preset voice data that is associated with the status information received from the second communication terminal. As a response to the request (request to select the preset voice data) from the exchange functional unit 102, the voice-text conversion unit 105 passes the preset voice data that has been selected by the third selection section 119 to the exchange functional unit 102. The exchange functional unit 102 performs control to transmit the preset voice data that has been selected by the third selection section 119 to the first communication terminal. In the present example, the exchange functional unit 102 may be considered to have a function that is comparable to a function of the "third transmission control it" in the claims.

The following further describes FIG. 2. The text data conversion information storage section 120 illustrated in FIG. 2 stores therein a plurality of pieces of input information, each indicating a specific piece of information to be input to the communication terminal by the user, in association with respective preset (fixed) pieces of text data. The voice data conversion information storage section 118 may store, for example, a specific piece of input information indicating a number of "9" that is input by the user's depressing the pushbutton "9" on the communication terminal in association with text data that indicates a character string of "urgent".

When input information is received from one (second communication terminal) of the two communication terminals for which matching has been performed by the exchange functional unit 102, the fourth selection section 121 refers to the text data conversion information storage section 120 and selects a specific piece of preset text data that is associated with the input information received from the second communication terminal.

When the input information is received from the second communication terminal via the communication interface unit 104, the exchange functional unit 102 requests the voice-text conversion unit 105 to select the piece of preset text data that is associated with the input information received from the second communication terminal. The voice-text conversion unit 105, upon receipt of the foregoing request, instructs the fourth selection section 121 to select the text data that is associated with the input information received from the second communication terminal. The fourth selection section 121, having received the foregoing instruction, refers to the text data conversion information storage section 120 and selects the preset text data that is associated with the input information received from the second communication terminal. As a response to the request (request to select the preset text data) from the exchange functional unit 102, the voice-text conversion unit 105 passes the preset text data that has been selected by the fourth selection section 121 to the exchange functional unit 102. The exchange functional unit 102 performs control to transmit the preset text data that has been selected by the fourth selection section 121 to the first communication terminal. In the present example, the exchange functional unit 102 may be considered to have a function that is comparable to a function of the "fourth transmission control unit" to the claims.

The relay apparatus 30 described above may be formed through a hardware configuration incorporating an ordinary computer that includes a CPU, a storage device such as a read only memory (ROM) and a RAM, a HDD, an external storage device such as a CD drive, a display device such as a display, and an input device such as a keyboard and a mouse. Additionally, part of the functions of the respective units (e.g., the first selection section 113, the first conversion section 114, the second selection section 116, the second conversion section 117, the third selection section 119, and the fourth selection section 121) of the relay apparatus 30 may be achieved by a CPU executing a computer program stored in the storage device. The part of the functions may even be achieved by a dedicated hardware circuit (e.g., a semiconductor integrated circuit).

The computer program executed by the relay apparatus 30 may be provided by being stored in a computer connected to a network such as the Internet and downloaded via the network. The computer program executed by the relay apparatus 30 may be provided or distributed via a network such as the Internet. Alternatively, the computer program executed by the relay apparatus 30 may be provided by being incorporated in, for example, a ROM or other nonvolatile recording medium in advance.

Figure 9:
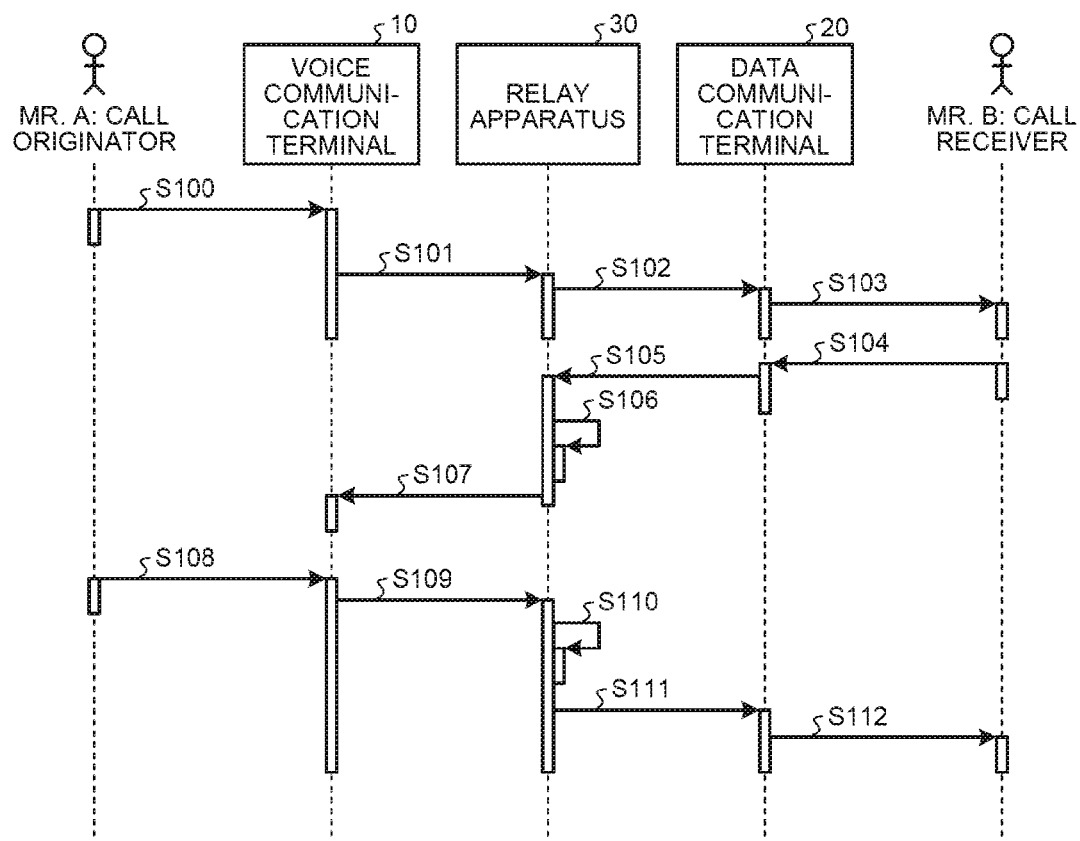
FIG. 9 is a sequence diagram illustrating an exemplary process of communication performed between users who use communication terminals.

The following describes, with reference to FIG. 9, an exemplary process of communication performed between user A who uses the voice communication terminal 10 and user B who uses the data communication terminal 20. The example illustrated in FIG. 9 assumes that user B is in a situation in which it is difficult to answer the phone. User A first performs a call originating operation (including an input of a telephone number) for calling the data communication terminal 20 (Step S106). The voice communication terminal 10, having received this call originating operation, transmits a connection request signal including the telephone number of the data communication terminal 20 to the relay apparatus 30 (Step S101). The relay apparatus 30, having received this connection request signal, refers to the numbering plan information and the terminal information retained by the administration unit 101 to thereby perform matching between the voice communication terminal 10 (call originator) and the data communication terminal 20 (call receiver) and transmits to the data communication terminal 20 a calling signal (ringing tone) (Step S102). In the present example, the data communication terminal 20, upon receipt of the calling signal, displays the screen illustrated in FIG. 10 on the display unit (Step S103). The screen illustrated in FIG. 10 includes a UI button 201 associated with the status information indicating "meeting", a UI button 202 associated with the status information indicating "moving", a UI button 203 associated with the status information indicating "tied up", and a UI button 204 associated with any other function for notifying the call originator that the call receiver is in a situation in which voice communication cannot be carried out.

On the screen displayed on the display unit of the data communication terminal 20, user B performs an operation to select any one of the UT buttons (Step S104). The data communication terminal 20 transmits to the relay apparatus 30 information (data) corresponding to the operation performed by user B together with Busy information that indicates that the user is in a situation in which voice communication cannot be carried out (Step S105).

Figure 10:
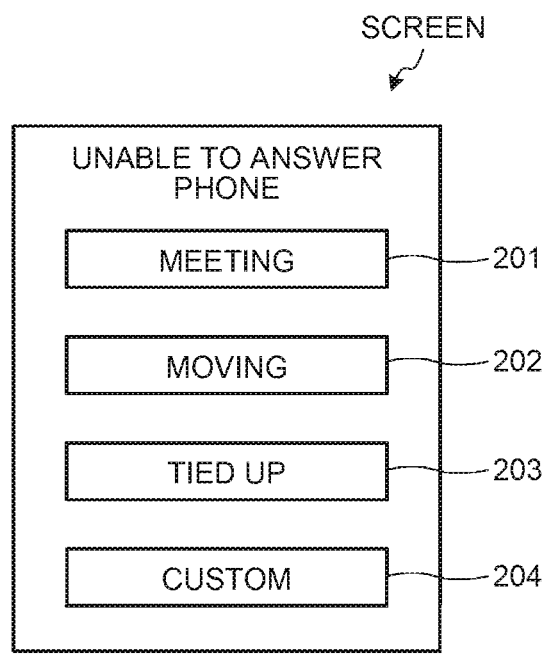
FIG. 10 is a diagram illustrating an exemplary screen displayed on a display unit of a data communication terminal.

When, for example, user B depresses the UI button 201 illustrated in FIG. 10, the data communication terminal 20 transmits to the relay apparatus 30 the status information indicating "meeting" and the Busy information. When, for example, user B depresses the UI button 204 (UI button marked with "custom") illustrated in FIG. 10, the data communication terminal 20 switches to a screen that includes, for example, a UI button not illustrated (for convenience sake, referred to as a "first UI button") corresponding to a function of notifying the call originator of any input character string converted into voice and a UI button not illustrated (for convenience sake, referred to as a "second UI button") corresponding to a function of notifying the call originator that the call receiver will call back (making a call again) later after the lapse of a specified period of time. When user B then depresses the first UI button, for example, the data communication terminal 20 displays a screen prompting the input of a character string and receives the input of the character string. The data communication terminal 20 transmits to the relay apparatus 30 text data indicating the character string input by user B and the Busy information.

The relay apparatus 30, having received the Busy information and the information that corresponds to the operation performed by user B from the data communication terminal 20, performs processing according to the received information (Step S106) and transmits a result of the processing to the voice communication terminal 10 (Step S107). Consider, for example, a case in which the relay apparatus 30 receives from the data communication terminal 20 the Busy information and text data (any character string input by user B). In this case, the relay apparatus 30 performs a process of converting the text data received from the data communication terminal 20 into voice data using the first dictionary information that is associated with the terminal information of the data communication terminal 20 as described previously and transmits the converted voice data to the voice communication terminal 10. In the present example, the Busy information corresponds to the second instruction information (information for instructing conversion of text data into voice data) described previously and the data communication terminal 20 corresponds to the second communication terminal described previously. Consider, for example, another case in which the relay apparatus 30 receives from the data communication terminal 20 the Busy information and status information selected by user B. In this case, the relay apparatus 30 transmits to the voice communication terminal 10 the preset voice data that is associated with the status information received from the data communication terminal 20.

User A, having heard the voice data transmitted from the relay apparatus 30 to the voice communication terminal 10 as described above, now can utter a message (input voice data), for example, in order to provide information to be referenced when user B determines whether to answer the telephone (Step S108). In this case, the voice communication terminal 10 transmits the voice data input by user A to the relay apparatus 30 (Step S109). The relay apparatus 30, having received the voice data, performs a process of converting the voice data received from the voice communication terminal 10 into text data using the second dictionary information that is associated with the terminal information of the voice communication terminal 10 as described previously (Step S110) and transmits the converted text data into the data communication terminal 20 (Step S111). The data communication terminal 20 displays the text data received from the relay apparatus 30 on the display unit (Step S112). User B confirms the text data displayed on the display unit of the data communication terminal 20 to thereby be able to determine whether to answer the telephone.

Figure 11:
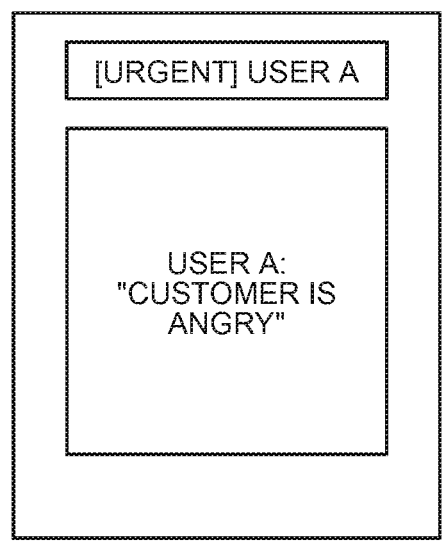
FIG. 11 is a diagram illustrating another exemplary screen displayed on the display unit of the data communication terminal.

At Step S108 described above, user A can also input the input information in addition to uttering the message. To inform user B of an emergency, for example, user A can depress a pushbutton of "9" provided on the voice communication terminal 10 to thereby input the input information indicating the number "9". In this case, the voice communication terminal 10 transmits to the relay apparatus 30 the input information indicating the number "9". The relay apparatus 30, having received this input information, performs a process of selecting the preset text data that is associated with the received input information (in the present example, the text data indicating a character string of "urgent") as described previously and transmits the selected text data to the data communication terminal 20. The data communication terminal 20 displays the text data received from the relay apparatus 30 on the display unit. FIG. 11 is a diagram illustrating an exemplary screen displayed on the display unit of the data communication terminal 20. The screen illustrated in FIG. 11 displays the text data indicating the character string of "urgent" and the text data indicating the speech uttered by user A. It is noted that, at Step S108, user A can not only utter the message, but also input the input information, or can selectively utter the message or input the input information, for example.

In summary, the relay apparatus 30 according to the present embodiment, having received voice data from the second communication terminal that communicates with the first communication terminal, selects first dictionary information in which the characteristic information associated with the terminal information of the second communication terminal is incorporated and, using the selected first dictionary information, converts the voice data received from the second communication terminal into text data and transmits the converted text data to the first communication terminal. The relay apparatus 30 in the present embodiment can thus achieve an advantageous effect that accuracy in converting input voice data into text data can be enhanced.

Additionally, when text data is received from the second communication terminal, the relay apparatus 30 in the present embodiment selects second dictionary information in which the characteristic information associated with the terminal information of the second communication terminal is incorporated and, using the selected second dictionary information, converts the text data received from the second communication terminal into voice data and transmits the converted voice data to the first communication terminal. The relay apparatus 30 in the present embodiment can thus achieve an advantageous effect that accuracy in converting input text data into voice data can be enhanced.

Additionally, in the present embodiment, the relay apparatus 30 that relays from one communication terminal to another converts input text data into voice data or input voice data to text data. Compared with a configuration in which each communication terminal converts input text data into voice data or input voice data to text data, the foregoing arrangement can reduce load on each communication terminal. Specifically, in the present embodiment, power consumption of each communication terminal can be reduced, so that the arrangement of the present embodiment is particularly effective in a communication system that includes a communication terminal operating on a storage battery, for example.

Although the present invention has been described with reference to an illustrative embodiment, it will be understood that the embodiment is illustrative only is not intended to be restrictive of the scope of the present invention. The present invention is not limited directly to the embodiment described above and various modifications in the elements may be made without departing from the intended scope of the present invention. Additionally, the elements disclosed in the embodiment may be combined in different manners to achieve various configurations of the present invention. For example, some of the elements in the embodiment may be deleted.

In the example illustrated in FIG. 9, for example, when the Busy information is received from the data communication terminal 20, the relay apparatus 30 thereafter determines to convert the voice data received from the voice communication terminal 10 into text data. Specifically, if the voice communication terminal 10 is considered to be the second communication terminal, then the Busy information may be considered to correspond to the first instruction information (information for instructing conversion of voice data into text data). The arrangement is, however, illustrative only and is not intended to be in any way limiting. The following another arrangement may be possible. Specifically, at Step S108 in FIG. 9, for example, user A may perform, in uttering the message, an operation to input a number (e.g., "99") or a code that corresponds to the instruction to convert voice data into text data and, at Step S109 in FIG. 9, the voice communication terminal 10 may transmit to the relay apparatus 30 the voice data that indicates the speech details uttered by user A and predetermined information that indicates the number or code that corresponds to the instruction to convert voice data into text data. Then, the relay apparatus 30, having received the predetermined information from the voice communication terminal 10, performs the process of converting the voice data received from the voice communication terminal 10 into text data. Specifically, in the present example, the predetermined information may be considered comparable to the first instruction information.

To sum up, when the first instruction information for instructing conversion of voice data into text data is received (whether from the first communication terminal or the second communication terminal), the relay apparatus 30 can perform the process of converting the voice data received from the second communication terminal into text data. Similarly, when the second instruction information for instructing conversion of text data into voice data is received (whether from the first communication terminal or the second communication terminal), the relay apparatus 30 can perform the process of converting the text data received from the second communication terminal into voice data.

In the embodiment described above, when the first instruction information is received, the relay apparatus 30 converts the voice data received from the second communication terminal into text data and transmits the converted text data to the first communication terminal. The arrangement is, however, illustrative only and is not intended to be in any way limiting. For example, when voice data is received from the second communication terminal, the relay apparatus 30 may unconditionally convert the received voice data into text data and transmit the converted text data to the first communication terminal. Similarly, in the embodiment described above, when the second instruction information is received, the relay apparatus 30 converts the text data received from the second communication terminal into voice data and transmits the converted voice data to the first communication terminal. The arrangement is, however, illustrative only and is not intended to be in any way limiting. For example, when text data is received from the second communication terminal, the relay apparatus 30 may unconditionally convert the received text data into voice data and transmit the converted voice data to the first communication terminal.

In addition, the relay apparatus 30, for example, preferably has a function of changing details of data in the characteristic information storage section 111, the first dictionary information storage section 112, the second dictionary information storage section 115, the voice data conversion information storage section 118, and the text data conversion information storage section 120. For example, the relay apparatus 30 may automatically update details of data in each of the characteristic information storage section 111, the first dictionary information storage section 112, the second dictionary information storage section 115 the voice data conversion information storage section 118, and the text data conversion information storage section 120 each time a predetermined period of time (e.g., one hour, one day, and one year elapses or may change details of the data in response to an instruction issued by the user.

Figure 12:
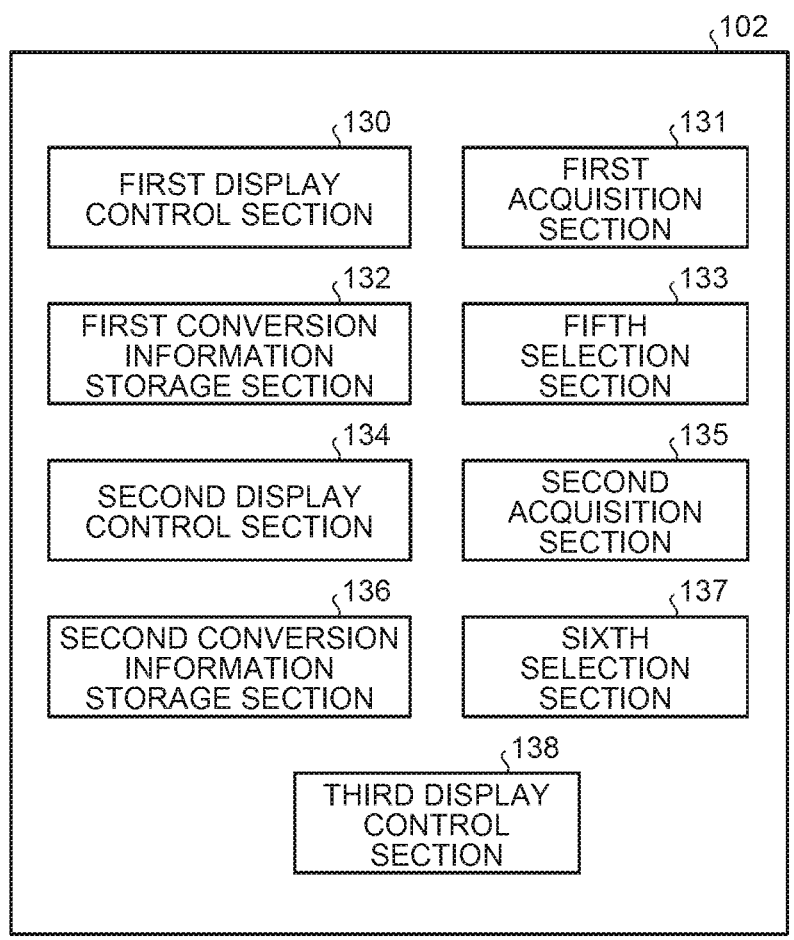
FIG. 12 is a diagram illustrating an exemplary functional configuration of an exchange functional unit according to a modification.

FIG. 12 is a diagram illustrating an exemplary functional configuration of an exchange functional unit 102 according to a modification. As illustrated in FIG. 12, the exchange functional unit 102 includes a first display control section 130, a first acquisition section 131, a first conversion information storage section 132, a fifth selection section 133, a second display control section 134, a second acquisition section 135, a second conversion information storage section 136, a sixth selection section 137, and a third display control section 138. In the present example, the exchange functional unit 102 (relay apparatus 30) may be considered to correspond to the "display apparatus" in the claims. For convenience sake, the example illustrated in FIG. 12 mainly illustrates functions relating to the present invention. Understandably, however, the exchange functional unit 102 may include additional functions. Each of the functions of the respective units (the first display control section 130, the first acquisition section 131, the fifth selection section 133, the second display control section 134, the second acquisition section 135, the sixth selection section 137, and the third display control section 138) of the exchange functional unit 102 may be achieved by a CPU mounted in the relay apparatus 30 executing a computer program stored in the storage device. Each of the functions may even be achieved by a dedicated hardware circuit (e.g., a semiconductor integrated circuit). In addition, the functions of the first conversion information storage section 132 and the second conversion information storage section 136 may be achieved by a storage device such as a ROM mounted in the relay apparatus 30.

To call the second communication terminal that is to communicate with the first communication terminal, the first display control section 130 performs control to display on the second communication terminal a first screen that includes at least a plurality of first selection images having one-to-one correspondence to respective pieces of status information representing different user statuses and that allows selection of status information. FIG. 13 is a diagram illustrating an exemplary first screen. In the example illustrated in FIG. 13, the first screen includes first selection images 151, 152, and 153, and UI images 154 and 155. Specifically, the first selection image 151 selects status information indicating "meeting". The first selection image 152 is for selecting status information indicating "moving". The first selection image 153 is for selecting status information indicating "tied up". The UI image 154 is for selecting to respond to the call-up. The UI image 155 is for selecting to reject the call-up. The first display control section 130 is not, however, limited to being configured as described above.

For example, the first display control section 130 may be configured to control to generate the first screen as illustrated in FIG. 13 and to transmit the generated first screen together with a calling signal to the second communication terminal. The first display control section 130 may, for example, be configured to control to transmit to the second communication terminal an instruction to generate and display the first screen as illustrated in FIG. 13 together with a calling signal.

Reference is made back to FIG. 12 and the following further describes FIG. 12. The first acquisition section 131 acquires from the second communication terminal the status information selected via the first selection image. In the present example, the second communication terminal transmits to the relay apparatus 30 the status information that corresponds to the first selection image depressed by the user.

The first conversion information storage section 132 stores therein a plurality of status information in association with respective pieces of first information. FIG. 14 is a diagram illustrating an exemplary configuration of the data stored in the first conversion information storage section 132. In the present example, the first information is text data. The present example is, however, illustrative only and the first information may, for example, be a code or a symbol that represents a specific status of the user. Specifically, the first information may assume any configuration.

Figures 15, 16:
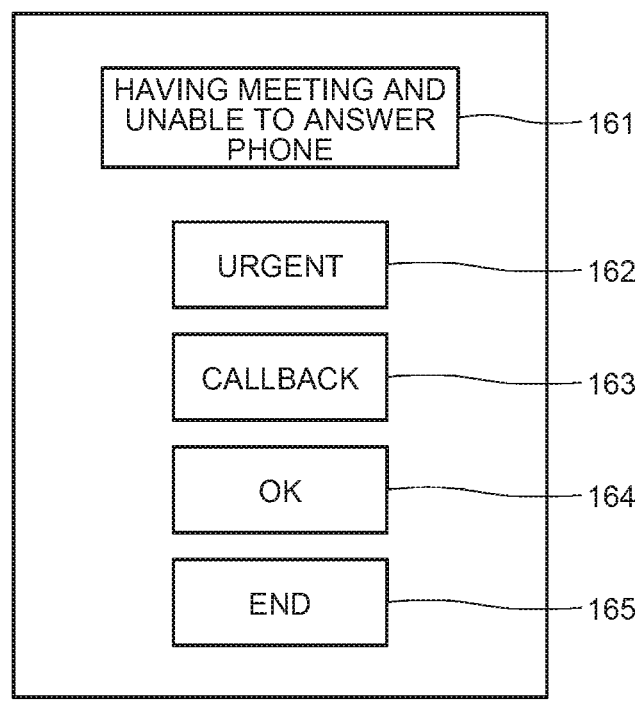
FIG. 15 a diagram illustrating an exemplary second screen.
FIG. 16 is a diagram illustrating an exemplary configuration of data stored in a second conversion information storage section.

Reference is made back to FIG. 12 and the following further describes FIG. 12. The fifth selection section 133 selects a specific piece of the first information associated with the status information acquired by the first acquisition section 131. The second display control section 134 performs control to display on the first communication terminal a second screen that includes at least the first information selected by the fifth selection section 133. The second screen, for example, may include a plurality of second selection images that have one-to-one correspondence to respective pieces of notification information representing different details of notification and that allow selection of a specific piece of the notification information. FIG. 15 is a diagram illustrating an exemplary second screen. In the example illustrated in FIG. 15, the second screen includes first information 161, second selection information 162, a second selection image 163, a second selection image 164, and a UI image 165. Specifically, the first information 1 (in the present example, text data of "Having meeting and unable to answer phone") associated with the status information indicating "meeting". The second selection information 162 is for selecting notification information indicating "urgent". The second selection image 163 is for selecting notification information indicating "callback". The second selection image 164 is for selecting notification information indicating "ok". The UI image 165 is for selecting to terminate the connection. The arrangement is not, however, limited to being configured as described above.

For example, the second display control section 134 may be configured to control to generate the second screen as illustrated in FIG. 15 and to transmit the generated second screen to the first communication terminal. The second display control section 134 may, for example, be configured to control to transmit to the first communication terminal an instruction to generate and display the second screen as illustrated in FIG. 15.

Reference is made back to FIG. 12 and the following further describes FIG. 12. The second acquisition section 135 acquires from the first communication terminal the notification information selected via the second selection image. In the present example, the first communication terminal transmits to the relay apparatus 30 the notification information that corresponds to the second selection image depressed by the user.

The second conversion information storage section 136 stores therein a plurality of notification information in association with respective pieces of second information. FIG. 16 is a diagram illustrating an exemplary configuration of the data stored in the second conversion information storage section 136. In the present example, the second information is text data. The present example is, however, illustrative only and the second information may, for example, be a code or a symbol that represents specific details of notification.

Figure 17:
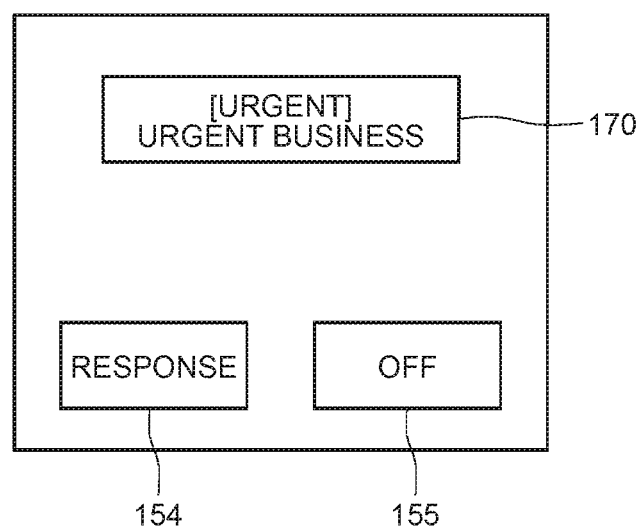
FIG. 17 a diagram illustrating an exemplary third screen.

Reference is made back to FIG. 12 and the following further describes FIG. 12. The sixth selection section 137 selects the second information that is associated with the notification information acquired by the second acquisition section 135. The third display control section 138 performs control to display on the second communication terminal a third screen that includes at least the second information selected by the sixth selection section 137. FIG. 17 is a diagram illustrating an exemplary third screen. In the example illustrated in FIG. 17, the third screen includes second information 170, and the UI images 154 and 155. Specifically, the second information 170 (in the present example, text data of "[Urgent] Urgent business") is associated with the notification information representing "urgent". The UI image 154 is for selecting to respond to the call-up. The UI image 155 is for selecting to reject the call-up. The arrangement is not, however, limited to being configured as described above. The third display control section 138 may even be configured, for example, to control such that, when the notification information representing "ok" is received from the second acquisition section 135, the third display control section 138 performs control to display on the second communication terminal the third screen that includes at least the second information associated with the notification information before controlling to terminate the connection.

Figure 18:
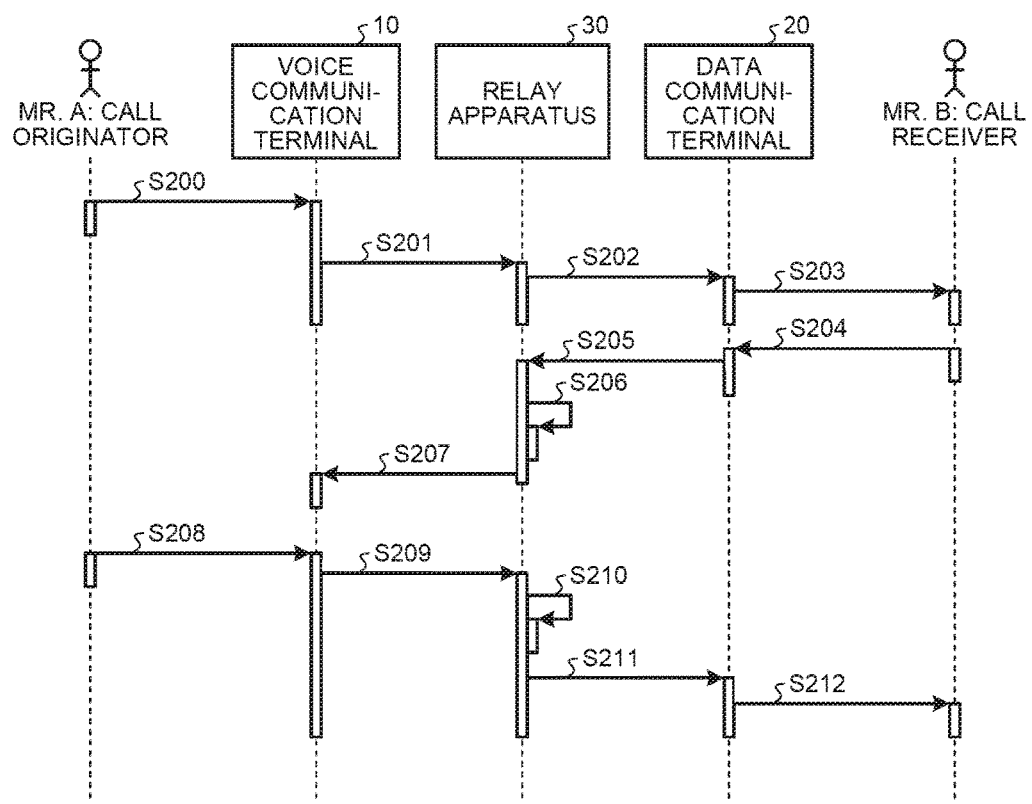
FIG. 18 a sequence diagram illustrating an exemplary process of communication performed between users who use communication terminals.

FIG. 18 is a sequence diagram illustrating an exemplary process of communication performed between user A who uses the voice communication terminal 10 (that corresponds to the first communication terminal in the present example) and user B who uses the data communication terminal 20 (that corresponds to the second communication terminal in the present example) according to the present modification. The example illustrated in FIG. 18 assumes that user B is in a situation in which it is difficult to answer the phone. The example illustrated in FIG. 18 further assumes that the voice communication terminal 10 is a telephone terminal having a voice communication function and a rich UI. Examples of the voice communication terminal 10 include, but are not limited to, a mobile telephone terminal (including a smartphone) and a business phone. Details of the steps from Step S200 to Step S202 are the same as those of the steps from Step S100 to Step S102 in FIG. 9. In the present example, when an instruction to generate and display the first screen illustrated in FIG. 13 together with a calling signal is received from the relay apparatus 30 (first display control section 130), the data communication terminal 20 generates and displays the first screen illustrated in FIG. 13 on the display unit in accordance with the instruction (Step S203).

In the present example, user B performs an operation to depress any one of the first selection images on the first screen displayed on the display unit of the data communication terminal 20 (Step S204). The data communication terminal 20 transmits the status information corresponding to the first selection image that has been depressed by user B to the relay apparatus 30 (Step S205). If, for example, user B depresses the first selection image 151 illustrated in FIG. 13, the data communication terminal 20 transmits the status information indicating "meeting" to the relay apparatus 30.

The relay apparatus 30, having received the status information from the data communication terminal 20, selects the first information that is associated with the received status information (Step S206). The relay apparatus 30 transmits to the voice communication terminal 10 an instruction to generate and display the second screen (see, for example, FIG. 15) that includes at least the first information selected at Step S206 (Step S207). The voice communication terminal 10 generates and displays on the display unit the second screen in accordance with the instruction received from the relay apparatus 30. In the present example, user A performs an operation to depress any one of the second selection images on the second screen displayed on the display unit of the voice communication terminal 10 (Step S208). The voice communication terminal 10 transmits the notification information corresponding to the second selection image that has been depressed by user A to the relay apparatus 30 (Step S209).

The relay apparatus 30, having received the notification information from the voice communication terminal 10, selects the second information that is associated with the received notification information (Step S210). The relay apparatus 30 then transmits to the data communication terminal 20 an instruction to generate and display the third screen (see, for example, FIG. 17) that includes at least the second information selected at Step S210 (Step S211). The data communication terminal 20 generates and displays on the display unit the third screen in accordance with the instruction received from the relay apparatus 30 (Step S212). User B confirms the third screen displayed on the display unit of the data communication terminal 20 to thereby determine whether to answer the telephone.

In the embodiment and the modification described above, the first selection section 113 may select, as the characteristic information associated with each piece of terminal information, the characteristic information that varies according to time and location. As exemplarily illustrated in FIG. 19, the above-described characteristic information storage section 111 may store therein the terminal information indicated by "xxx-001" in association with the occupation information indicating "sales" as the characteristic information to be selected in the period of time from 9:00 a.m. to 18:00 p.m. and with the occupation information indicating "father" as the characteristic information to be selected in the period of time of other hours. In the present example, the above-described first dictionary information storage section 112 stores therein the occupation information indicating "father" in association with the first dictionary information in which that particular occupation information is incorporated (a piece of first dictionary information different from the piece of first dictionary information that is associated with the occupation information indicating "sales")

As exemplarily illustrated in FIG. 20, the above-described characteristic information storage section 111 may store therein the terminal information indicated by "xxx-001" in association with the occupation information indicating "sales" as the characteristic information to be selected when the communication terminal identified by the terminal information is located in an area within: _km around the house of the user who uses the communication terminal and with the occupation information indicating "father" as the characteristic information to be selected in other cases. It is noted that various types of known techniques may be used as the method for detecting the location of the communication terminal. For example, the relay apparatus 30 may use GPS and the like to detect the location of the communication terminal.

REFERENCE SIGNS LIST

1 Communication system
10 Voice communication terminal
20 Data communication terminal
30 Relay apparatus
101 Administration unit
102 Exchange functional unit
103 Mail control unit
104 Communication interface unit
105 Voice-text conversion unit
111 Characteristic information storage section
112 First dictionary information storage section
113 First selection section
114 First conversion section
115 Second dictionary information storage section
116 Second selection section
117 Second conversion section
118 Voice data conversion information storage section
119 Third selection section
120 Text data conversion information storage section
121 Fourth selection section
130 First display control section
131 First acquisition section
132 First conversion information storage section
133 Fifth selection section
134 Second display control section
135 Second acquisition section
136 Second conversion information storage section
137 Sixth selection section
138 Third display control section

CITATION LIST

Patent Literature

Patent Literature 1: Japanese Laid-open Patent Publication No. 2002-244688

The invention claimed is:
1. A relay apparatus to relay a communication among a plurality of communication terminals including at least a first communication terminal and a second communication terminal, the relay apparatus comprising:
circuitry configured to:
store a plurality of pieces of characteristic information, each indicating a characteristic of a user who uses a corresponding communication terminal, so that each of a plurality of pieces of terminal information for identifying the corresponding communication terminal is associated with a corresponding one of the pieces of characteristic information;
store a plurality of pieces of second dictionary information, each used for converting text data into voice data, so that each piece of the characteristic information is a corresponding one of the pieces of second dictionary information in which the each piece of the characteristic information is incorporated;
when the text data is received from the second communication terminal that is to communicate with the first communication terminal, select a piece of the charac- teristic information associated with a piece of the terminal information for identifying the second communication terminal, the characteristic information including at least sex, age, and occupation of the user, and select a piece of the second dictionary information associated with the selected piece of the characteristic information; and convert the text data received from the second communication terminal into the voice data using the piece of the second dictionary information selected, wherein the user selects one of a plurality of texts displayed on a touch screen by touching and the selected text is converted into a preset voice data that expands the selected text with a larger number of words than the selected text.

2. The relay apparatus according to claim 1, wherein, when second instruction information for instructing conversion of the text data into the voice data is received, the circuitry is further configured to select the piece of the second dictionary information and, when the second instruction information is not received, the circuitry is further configured to not to select the piece of the second dictionary information.

3. The relay apparatus according to claim 1, wherein the circuitry is further configured to control transmitting of the voice data converted to the first communication terminal.

4. A communication system comprising:
a plurality of communication terminals that include at least a first communication terminal and a second communication terminal; and
the relay apparatus according to claim 1.

5. The relay apparatus according to claim 1, wherein the circuitry is further configured to:
store a plurality of pieces of predetermined voice data so that each of a plurality of pieces of status information, each representing a status of the user, is associated with a corresponding one of the pieces of the predetermined voice data; and
when a piece of the status information is received from the second communication terminal, select a piece of the predetermined voice data associated with the received piece of the status information.

6. The relay apparatus according to claim 5, wherein the circuitry is further configured to control transmitting of the piece of the predetermined voice data selected to the first communication terminal.

7. The relay apparatus according to claim 1, wherein the circuitry is further configured to:
store a plurality of pieces of predetermined text data so that each of a plurality of pieces of input information, each indicating a piece of information to be input to the second communication terminal by the user, is associated with a corresponding one of the pieces of the predetermined text data;
when a piece of the input information is received from the second communication terminal, select a piece of the predetermined text data associated with the received piece of the input information.

8. The relay apparatus according to claim 7, wherein the circuitry is further configured to control transmitting of the piece of the predetermined text data selected to the first communication terminal.

* * * * *